US010100708B2

(12) United States Patent
Lee et al.

(10) Patent No.: US 10,100,708 B2
(45) Date of Patent: Oct. 16, 2018

(54) ENGINE TEMPERATURE REGULATING DEVICE

(71) Applicant: SOUTHERN TAIWAN UNIVERSITY OF SCIENCE AND TECHNOLOGY, Tainan (TW)

(72) Inventors: Cho Yu Lee, Tainan (TW); Jui Hung Chang, Tainan (TW); Chin Fong Lim, Tainan (TW)

(73) Assignee: Southern Taiwan University of Science and Technology, Tainan (TW)

( * ) Notice: Subject to any disclaimer, the term of this patent is extended or adjusted under 35 U.S.C. 154(b) by 0 days.

(21) Appl. No.: 15/361,979

(22) Filed: Nov. 28, 2016

(65) Prior Publication Data
US 2018/0149072 A1 May 31, 2018

(51) Int. Cl.
*F01P 7/02* (2006.01)
*F01P 7/12* (2006.01)

(52) U.S. Cl.
CPC ............. *F01P 7/12* (2013.01); *F01P 2050/16* (2013.01)

(58) Field of Classification Search
CPC ...... F01P 7/12; F01P 2050/16; F01P 2070/50; F01P 2001/005; F01P 1/02; F01P 11/10; F01P 11/0285; F01P 2050/04
USPC ....................................... 123/41.05
See application file for complete search history.

(56) References Cited

U.S. PATENT DOCUMENTS

| 2,351,203 | A | * | 6/1944 | Hanson | F01P 7/10 123/41.04 |
|---|---|---|---|---|---|
| 2,638,881 | A | * | 5/1953 | Pankuch | B60K 11/085 123/41.05 |
| 2,654,354 | A | * | 10/1953 | Sanders | B60B 7/0086 123/41.05 |
| 2,703,075 | A | * | 3/1955 | Sanders | F01P 5/02 123/41.49 |
| 2,729,202 | A | * | 1/1956 | Sanders | F01P 11/10 123/41.04 |
| 4,756,279 | A | * | 7/1988 | Temmesfeld | F01P 11/10 123/198 E |
| 5,901,786 | A | * | 5/1999 | Patel | B60K 11/04 123/41.04 |
| 6,142,108 | A | * | 11/2000 | Blichmann | F01P 7/026 123/41.05 |
| 6,827,547 | B2 | * | 12/2004 | Robb | F04D 29/582 415/1 |
| 7,036,800 | B2 | * | 5/2006 | Ellis | A01M 1/205 261/26 |
| 7,182,047 | B1 | * | 2/2007 | Schwartz | F01P 5/06 123/41.04 |

* cited by examiner

*Primary Examiner* — Hung Q Nguyen
*Assistant Examiner* — Anthony Taylor, Jr.
(74) *Attorney, Agent, or Firm* — Rosenberg, Klein & Lee

(57) ABSTRACT

Disclosed is an engine temperature regulating device installed to a cool air inlet of a casing of an engine. The engine temperature regulating device includes a power source, a link rod module connected to the power source, a control module and a fan cover module including a fixed casing and a movable casing. The control module is provided for detecting a temperature when the engine is turned on to control the power source to drive the link rod module, so as to control the rotation of the connected movable casing and further adjust an air intake hole of the fixed casing to a smooth or obscured state.

3 Claims, 6 Drawing Sheets

ENGINE TEMPERATURE REGULATING DEVICE

FIELD OF INVENTION

The present invention relates to a temperature regulating device, in particular to the temperature regulating device installed to a casing with a cooled air inlet of an engine, and capable of adjusting an air intake hole to a smooth or obscured state according to a temperature change at the starting stage of the engine.

BACKGROUND OF INVENTION

Description of the Related Art

In general, a conventional compulsory cooling device of a motorcycle engine directly drives a cooling fan during the operation of the engine to suck surrounding cold air from the cooling fan into a wind hood, and the cold air in the wind hook cools the engine. In other words, once the engine is started, the cooling fan will be rotated accordingly. Until the engine is stopped, the cooling fan is stopped synchronously. Since a fan cover is covered and mounted onto the cooling fan for preventing foreign substances from entering into the fan cover, and the fan cover usually comes with an air intake hole with a fixed size. When the engine is just started and still situated in a warm-up stage, the cooling fan sucks a large quantity of cold air from the air intake hole of the fan cover. As a result, it takes a longer time for the warm-up process, and the motorcycle is not ready for running in a short time. In addition, a too-long warm-up process not just incurs high fuel consumption only, but also produces waste gas and pollutes the environment.

To overcome the aforementioned drawback, R.O.C. Pat. No. 1421405 discloses a "Motorcycle engine cooling device" having a temperature switch connected to a cooling fan and installed in a cylinder head of an engine or an oil tank. When the temperature of the cylinder head of the engine or the oil tank is greater than or equal to a predetermined value, the temperature switch will be electrically conducted to turn on the cooling fan, and if the temperature of the cylinder head of the engine or the oil tank is smaller than a predetermined value, the temperature switch will not be electrically conducted, and the cooling fan will be turned off.

In addition, U.S. Pat. No. 6,142,108 discloses a "Temperature control system for use with an enclosure which houses an internal combustion engine" having a plurality of adjoining walls of the enclosure of the temperature control system, and an inlet louver assembly and an outlet louver assembly of an actuator are coupled to the walls. When a temperature sensor senses a temperature signal and outputs the temperature signal to an electrical processing circuit, the electrical processing circuit controls the actuator to drive the outlet louvers to move. Although such patent can adjust the size of the louvers according to temperature, the fan structure requires an inlet louver assembly and outlet louver assembly to be installed at the front and rear ends of the fan structure respectively. Obviously, the drawback of such patent includes requiring too many components and too complicated structure.

In view of the aforementioned drawbacks, the inventor of the present invention based on years of experience in the related industry to conduct extensive research and experiment, and finally developed an engine temperature regulating device in accordance with the present invention to overcome the drawbacks of the prior art.

SUMMARY OF THE INVENTION

Since the conventional compulsory cooling device of a motorcycle has the drawbacks of causing a long warm-up process, increasing the fuel consumption, and polluting the environment, therefore, it is a primary objective of the present invention to control the timing of the cold air entering into the cooled air inlet by the adjustable fan cover module, so as to prevent a large quantity of cold air from affecting the engine warm-up time and achieve the effects of lowering the fuel consumption and reducing waste gas discharge.

To achieve the aforementioned and other objectives, the present invention provides an engine temperature regulating device installed in a casing with a cooled air inlet, comprising: a power source; a link rod module, connected to the power source; a control module, for detecting a temperature for starting the engine to obtain a temperature signal, and controlling the drive of the power source when the temperature signal is lower than a predetermined value or controlling and turning off the power source when the temperature signal achieves the predetermined value; and a fan cover module, covered onto the cooled air inlet, and further comprising: a fixed casing, formed by mounting a first surrounding member around the fixed casing, and the first sidewall having a plurality of first air intake holes and a plurality of first shelter plates arranged alternately with one another, and disposed at a plurality of first ventilation holes of the first surrounding member, and at least one fixed block disposed around the external periphery of the first surrounding member and capable of locking the casing with the cooled air inlet; and a movable casing, formed by mounting a second surrounding member around a second sidewall, and the second sidewall having a plurality of second air intake holes and a plurality of second shelter plates arranged alternately with one another, the second surrounding member having a plurality of second ventilation holes, and a positioning block disposed around the external periphery of the second surrounding member, and the link rod module being coupled to the movable casing, and the power source controlling the link rod module to rotate the movable casing, so as to adjust the first air intake hole and the first ventilation hole of the fixed casing to a smooth or obscured state, and when the first air intake hole is situated at the obscured state, the first ventilation hole still maintains a hole.

Wherein, the first air intake hole of the fixed casing is set to a smooth state when the engine is not started, and after the engine is started and if the engine temperature detected by the control module is lower than a predetermined value, then the power source will be driven to connect the power source to the link rod module, so that the movable casing of the link rod module will be rotated to cover the second shelter plate of the movable casing onto the first air intake hole of the fixed casing and drive the first air intake hole into the obscured state. Now, external cold air cannot enters from the air intake hole into the engine cooled air inlet, and the amount of air in the wind hood is limited to accelerate the engine warm-up process. If the engine temperature detected by the control module reaches a predetermined value, then the power source will be turned off, so that the link rod module coupled to the movable casing will restores its initial position and let the first air intake hole of the fixed casing and the second air intake hole of the movable casing be superimposed and drive them into the smooth state. As a result, surrounding cold air is sucked into the air inlet continuously to assist the heat dissipation of the engine.

BRIEF DESCRIPTION OF THE DRAWINGS

FIG. 4 is a schematic view of an engine temperature regulating device of the present invention at a state when the engine is turned on;

FIG. 6 is a side view of an engine temperature regulating device of the present invention at a state when the engine is turned on.

DESCRIPTION OF THE PREFERRED EMBODIMENTS

The above and other objects, features and advantages of this disclosure will become apparent from the following detailed description taken with the accompanying drawings.

Figure 1:
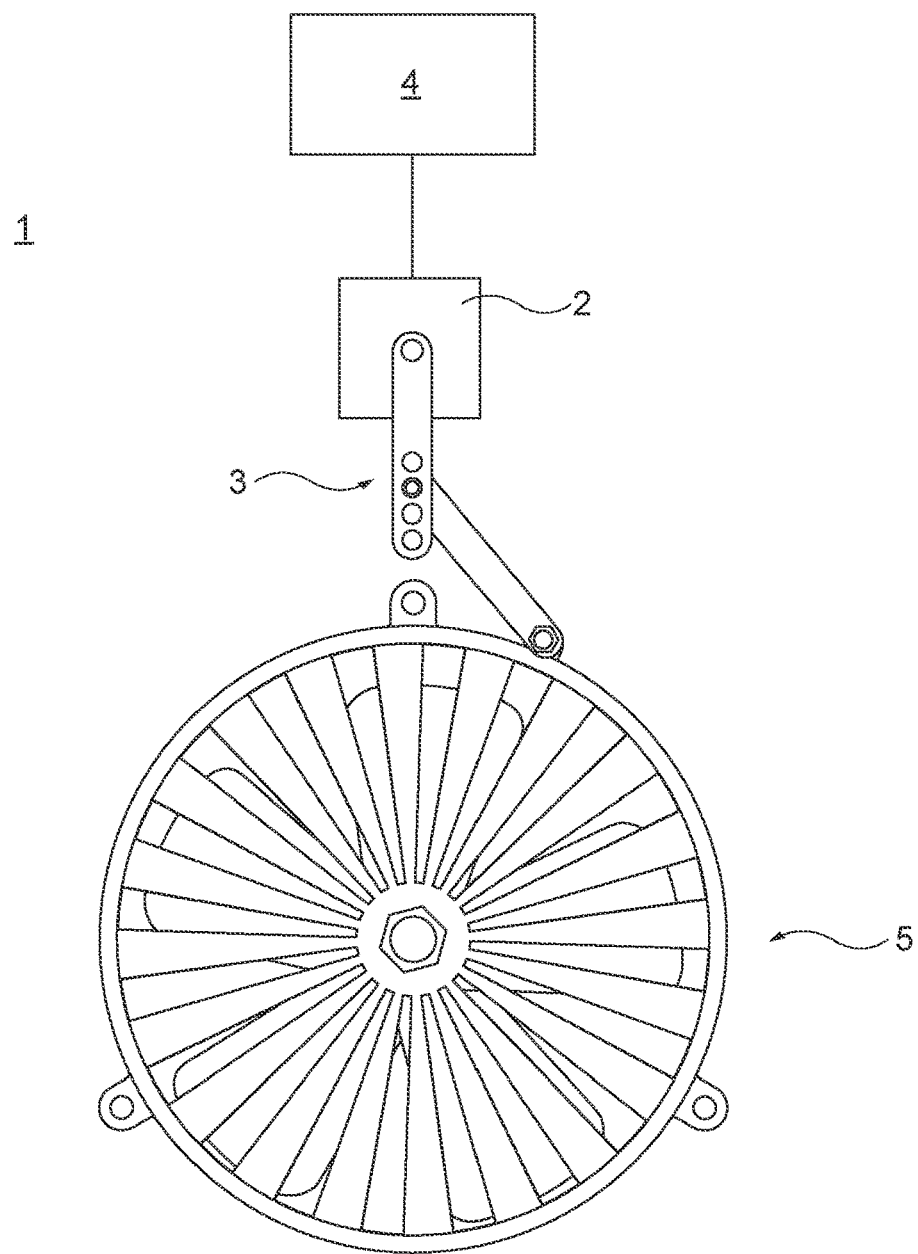
FIG. 1 is a schematic view of an engine temperature regulating device of the present invention.
Figure 2:
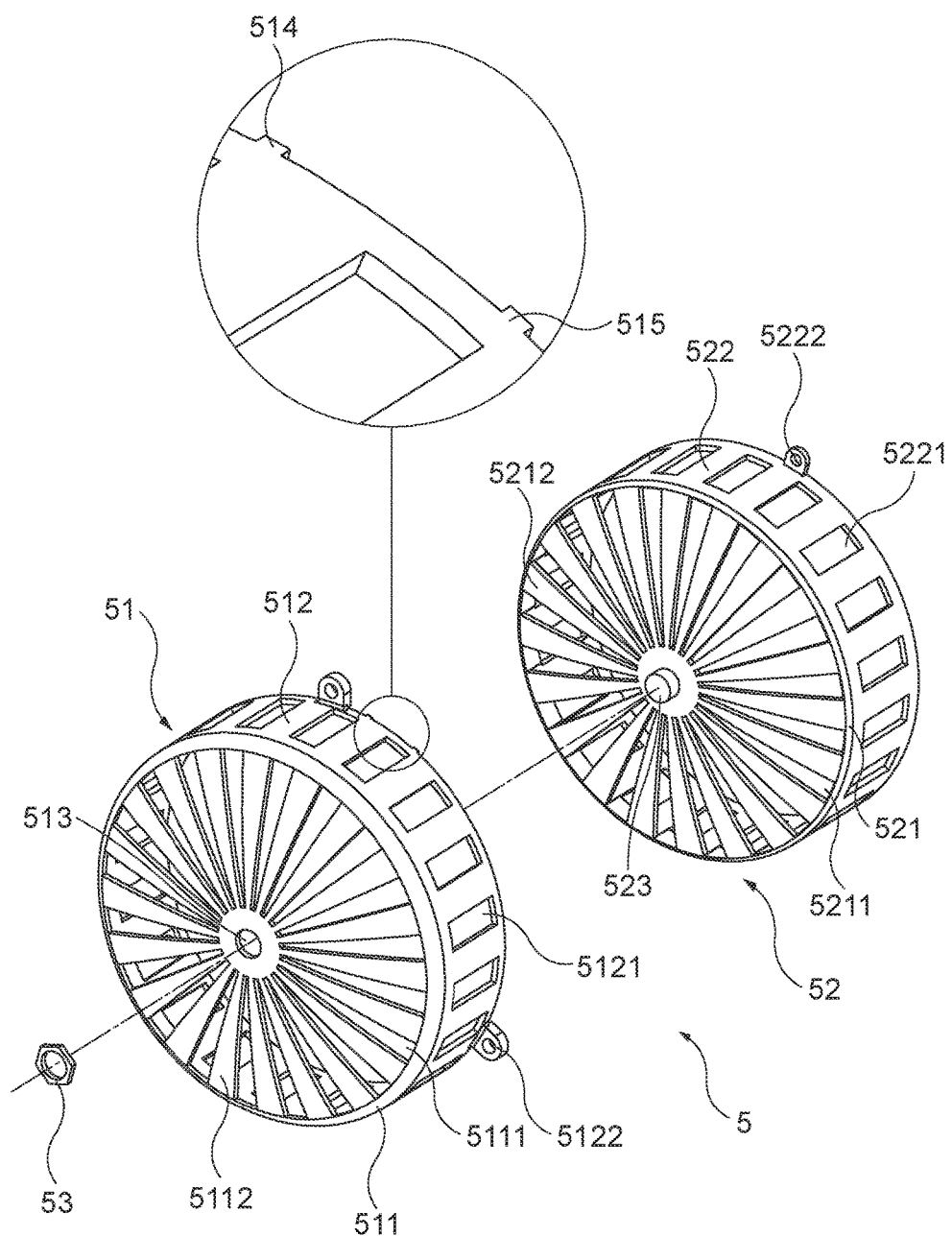
FIG. 2 is an exploded view of a fan cover module of the present invention.

With reference to FIGS. 1 and 2 for an engine temperature regulating device of the present invention, the engine temperature regulating device 1 is installed to a casing with a cooled air inlet and comprises a power source 2, a link rod module 3, a control module 4 and a fan cover module 5. The link rod module 3 is connected to the power source 2, and the power source 2 is preferably stepper motor; the control module 4 is provided for detecting a temperature for starting the engine to obtain a temperature signal, and if the temperature signal is lower than a predetermined value, the power source 2 will be controlled and driven, or if the temperature signal reaches a predetermined value, the power source 2 will be controlled to turn off. The fan cover module 5 is covered onto the engine cooled air inlet and comprises a fixed casing 51 and a movable casing 52, wherein the fixed casing 51 is formed by mounting a first surrounding member 512 around a first sidewall 511, and the first sidewall 511 has a plurality of first air intake holes 5111 and a plurality of first shelter plates 5112 arranged alternately with one another, and the first surrounding member 512 has a plurality of first ventilation holes 5121, and at least one fixing block 5122 disposed at the external periphery of the first surrounding member 512 and capable of being secured to the casing with a cooled air inlet. The movable casing 52 is formed by mounting a second surrounding member 522 around a second sidewall 521, and the second sidewall 521 has a plurality of second air intake holes 5211 and a plurality of second shelter plates 5212 arranged alternately with one another and the second surrounding member 522 has a plurality of second ventilation holes 5221, and a positioning block 5222 disposed at the external periphery of the second surrounding member 522 and the link rod module 3 is coupled to the movable casing 52.

In an embodiment of the present invention as shown in FIGS. 1 and 2, the fixed casing 51 has an opening 513, a first bump 514 and a second bump 515 formed at the external periphery of the fixed casing 51, and the movable casing 52 has a peg 523 configured to be corresponsive to the opening 513, so that the peg 523 of the movable casing 52 is passed into the opening 513 of the fixed casing 51, and a fastener 53 is provided for securing the peg 523, and the movable casing 52 can be pivotally rotated in the fixed casing 51 by using the peg 523 as an axis, and the positioning block 5222 of the movable casing 52 are limited and rotated between the first bump 514 and second bump 515 of the fixed casing 51.

Figure 3:
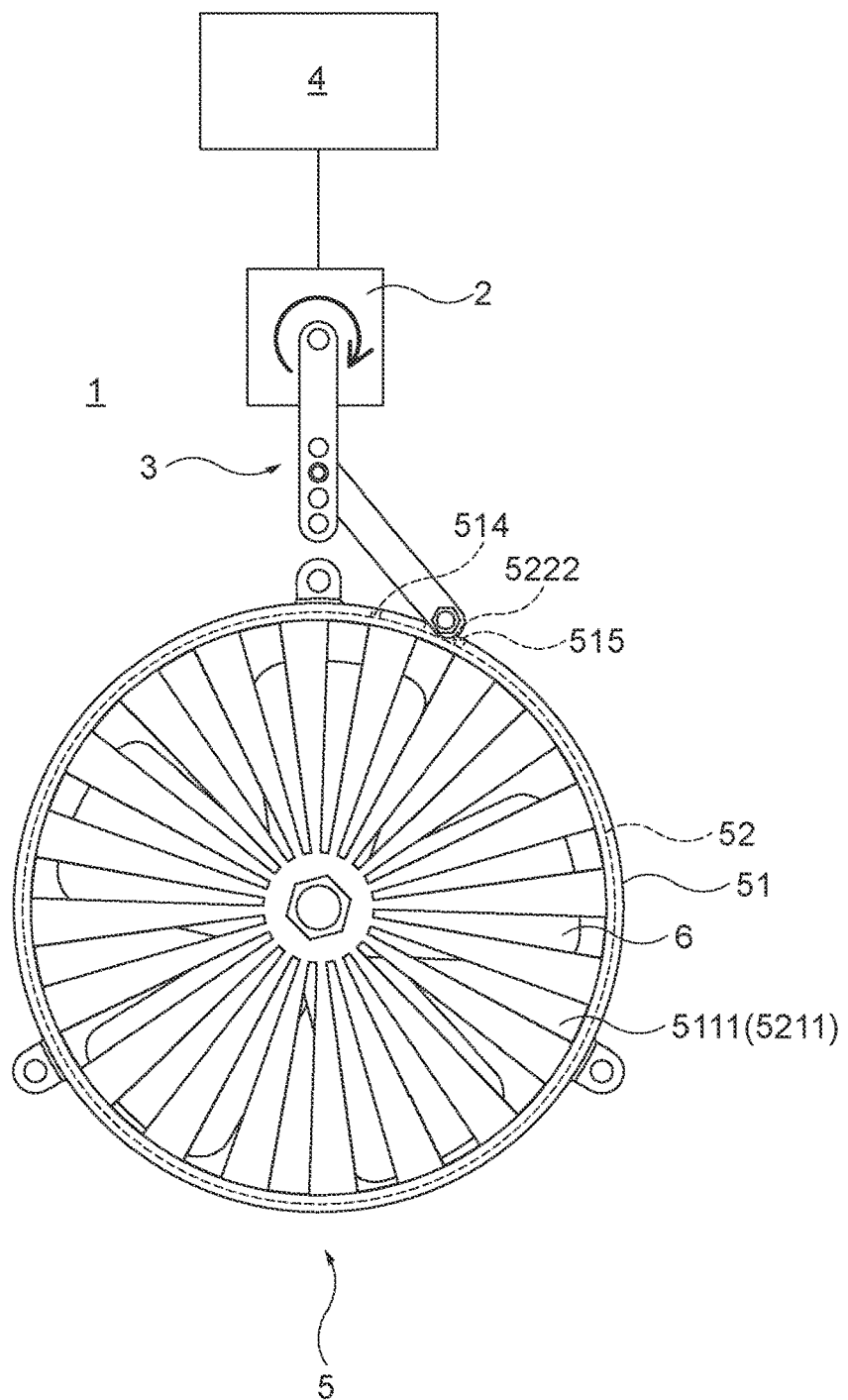
FIG. 3 is a schematic view of an engine temperature regulating device of the present invention at an initial state.

With reference to FIG. 3 for a schematic view showing the initial status of the engine temperature regulating device of the present invention device, the fan cover module 5 is covered onto a cooling fan 6 of the engine. When the engine is not started, the positioning block 5222 of the movable casing 52 abuts against the second bump 515 of the fixed casing 51, so that the first air intake hole 5111 of the fixed casing 51 and the second air intake hole 5211 of the movable casing 52 are superimposed and defaulted to a smooth state.

Figure 4:
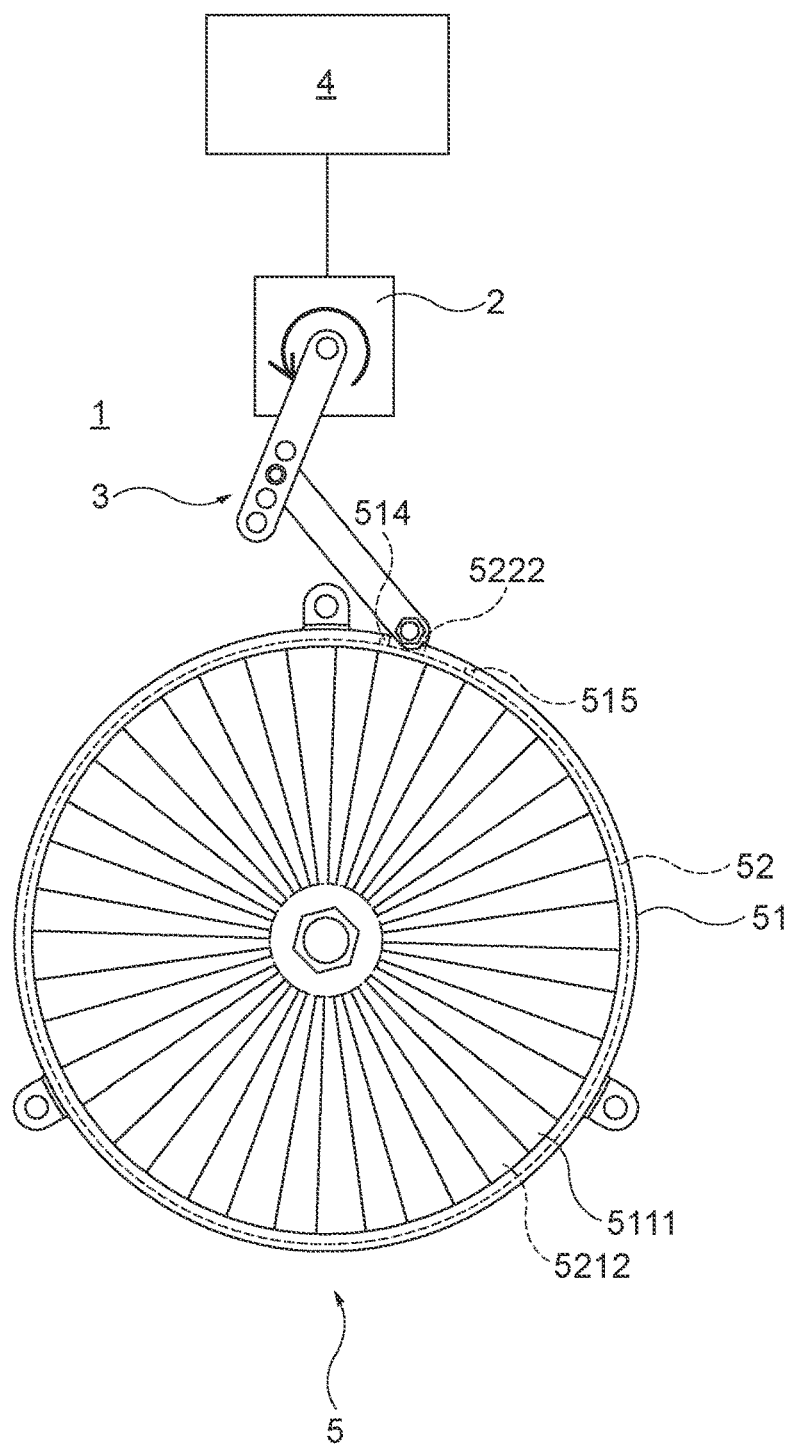

After the engine is started, the control module 4 detects an engine temperature immediately. If a detected temperature signal is lower than a predetermined value, the power source 2 will be controlled and driven to rotate the stepper motor to pull the link rod module 3 (as shown in FIG. 4), so that the positioning block 5222 linked with the link rod module 3 is moved to abut against the first bump 514, and the second shelter plate 5212 of the movable casing 52 is covered onto the first air intake hole 5111 of the fixed casing 51 to set the first air intake hole 5111 to an obscured state. Now, external cold air cannot be entered into the cooled air inlet of the engine from the first air intake hole 5111, sot that the air in the wind hood is limited to accelerate the engine warm-up process.

Figure 5:
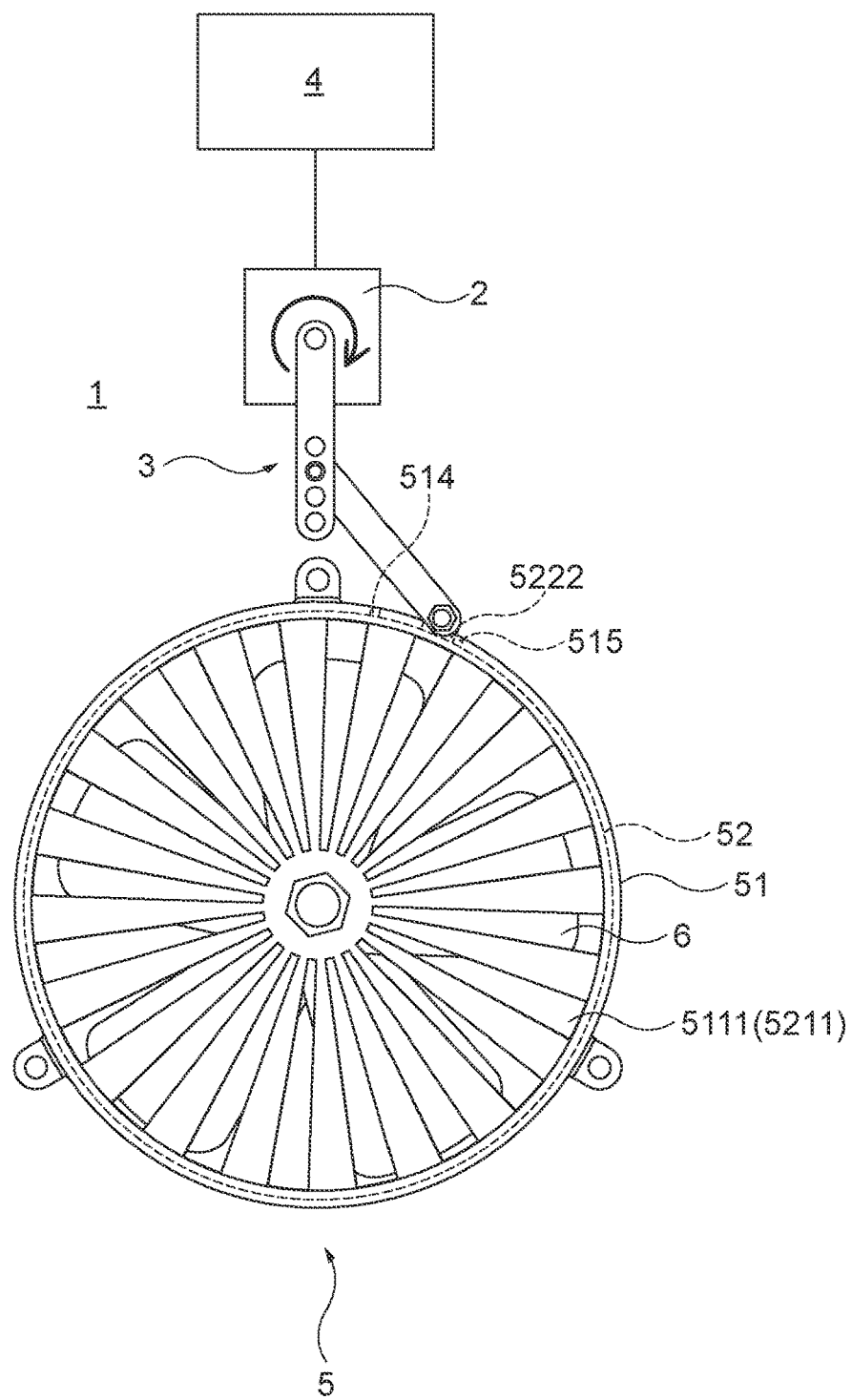
FIG. 5 is a schematic view of an engine temperature regulating device of the present invention at a state when the engine is turned off.

If the engine temperature detected by the control module 4 reaches a predetermined value, the power source 2 will be controlled to turn off, so that the stepper motor stops operating to resume the link rod module 3 to its initial position (as shown in FIG. 5), and the positioning block 5222 linked with the link rod module 3 will be moved back to the position of the second bump 515 to superimpose the first air intake hole 5111 of the of the fixed casing 51 and the second air intake hole 5211 of the movable casing 52 to set them into a smooth state, and the surrounding cold air can be sucked into the air inlet continuously to assist the heat dissipation of the engine.

Figure 6:
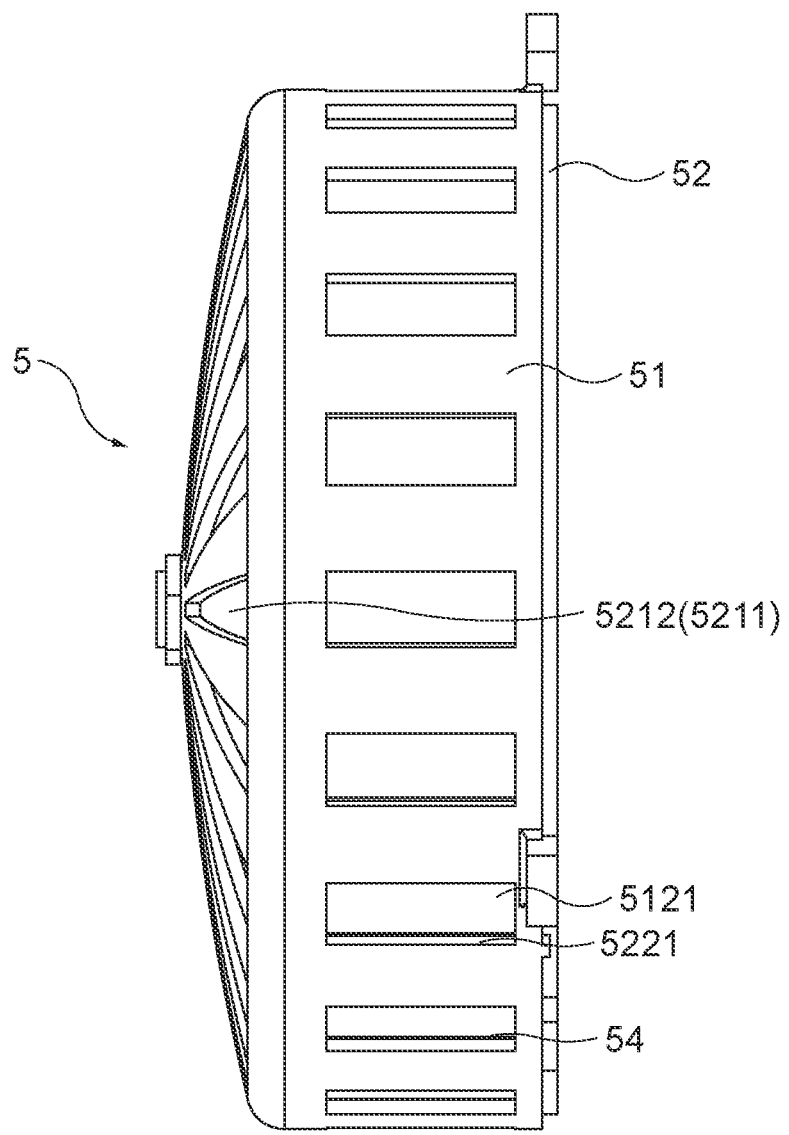

It is noteworthy that the first surrounding member 512 of the fixed casing 51 and the second surrounding member 522 of the movable casing 52 has a plurality of first ventilation holes 5121 and a second ventilation hole 5221 respectively (as shown in FIG. 2). When the second shelter plate 5212 of the movable casing 52 is covered onto the first air intake hole 5111 of the fixed casing 51, the first ventilation hole 5121 of the fixed casing 51 and the second ventilation hole 5221 of the movable casing 52 are not arranged alternately with one another, so as to form a hole 54 (as shown in FIG. 6) and prevent the air inlet of the engine from being closed completely to cause an overheat of the engine or an inconsistent heat dissipation.

Obviously, the engine temperature regulating device 1 of the present invention has the following effects:

1. The device 1 of the present invention can adjust the movement of the movable casing 52 of the fan cover module 5 according to the engine operating temperature, so that when the engine is just started and situated at a cold engine stage temperature which is lower than the operating temperature, the first air intake hole 5111 of the fixed casing 51 is adjusted to the obscured state to stop cooled airflow to enter into the engine and reduce the time for increasing the engine temperature to its operating temperature, so as to achieve the effects of lowering the fuel consumption, reducing the waste gas discharge of the engine. When the engine reaches the operating temperature, the first air intake hole 5111 of the fixed casing 51 resumes its smooth state and lets cooled airflow enter into the engine to assist the heat dissipation.

2. The first air intake hole 5111 and second air intake hole 5211 of the fan cover module 5 of the present invention are defaulted to the smooth state, and thus when the device 1 fails, the fan cover module 5 is in a closed state and the heat dissipation of the engine is affected. In addition, the first ventilation hole 5121 of the fixed casing 51 and the second ventilation hole 5221 of the movable casing 52 reserve a hole 54 when the first air intake hole 5111 is in the obscured state, so as to prevent overheat or inconsistent heat dissipation of the engine.

In summation of the description above, the technical measure disclosed by the present invention definitely can overcome the drawbacks of the prior art and achieve the expected objectives and effects. The present invention complies with patent application requirements, and is thus duly filed for patent application. While the invention has been described by means of specific embodiments, numerous modifications and variations could be made thereto by those skilled in the art without departing from the scope and spirit of the invention set forth in the claims.

What is claimed is:

1. An engine temperature regulating device, installed in a casing with a cooled air inlet, comprising:
    a power source;
    a link rod module rotatably coupled to the power source;
    a control module configured to detect a temperature when starting an engine in order to obtain a temperature signal, and control the power source to actuate the link rod module when the temperature signal is less than a predetermined value or turn off the power source when the temperature signal achieves the predetermined value; and
    a fan cover module, said fan cover module covering the cooled air inlet, and further comprising:
    a fixed casing, formed by a first surrounding member around a first sidewall, the first sidewall having a plurality of first air intake holes and a plurality of first shelter plates arranged alternatively with one another, the first surrounding member having a plurality of first ventilation holes, and at least one fixed block disposed on an external periphery of the first surrounding member, the at least one fixed block being capable of mounting the fixed casing with respect to the cooled air inlet; and
    a movable casing, formed by a second surrounding member around a second sidewall, the second sidewall having a plurality of second air intake holes and a plurality of second shelter plates arranged alternatively with one another, the second surrounding member having a plurality of second ventilation holes, and a positioning block disposed on an external periphery of the second surrounding member and extending radially outward from said external periphery of said second surrounding member, the link rod module being rotatably coupled to the positioning block of the movable casing, and the power source actuating the link rod module to rotate the movable casing responsive to actuation of the link rod module, for adjusting the plurality of first air intake holes and the plurality of first ventilation holes of the fixed casing to an opened or closed state, the opened or closed state being defined by the position of the fixed casing with respect to the movable casing, and when the plurality of first air intake holes are situated at the closed state, the plurality of first ventilation holes still maintain a passage for air to flow therethrough, said passage provided between each of the respective plurality of first and second ventilation holes;
    wherein the fixed casing has two bumps extending from the external periphery of the first surrounding member of the fixed casing, such that movement of the positioning block is limited between the two bumps.

2. The engine temperature regulating device of claim 1, wherein the fixed casing has an opening, and the movable casing has a peg corresponsive to the opening, such that when the peg of the movable casing is passed through the opening of the fixed casing, a fastener is screwed and secured to the peg, and the movable casing can be pivoted within the fixed casing by using the peg as an axis.

3. The engine temperature regulating device of claim 1, wherein the power source is a stepper motor.

* * * * *